United States Patent [19]

Bakewell

[11] 3,905,817

[45] Sept. 16, 1975

[54] METHOD OF MANUFACTURING A THIN ENCODER DISC

[75] Inventor: Joseph J. Bakewell, Boxford, Mass.

[73] Assignee: Dynamics Research Corporation, Wilmington, Mass.

[22] Filed: Aug. 6, 1973

[21] Appl. No.: 386,107

[52] U.S. Cl. .......................... 96/36; 156/11; 156/13; 156/15; 156/18

[51] Int. Cl.[2] .............................................. C23F 1/02

[58] Field of Search ........ 156/18, 11, 15, 13; 96/36, 96/36.4, 35.1; 350/316; 178/5.4

[56] References Cited

UNITED STATES PATENTS

| | | | |
|---|---|---|---|
| 3,520,745 | 7/1970 | Anderson | 156/18 |
| 3,687,664 | 8/1972 | Broadbent | 156/13 |
| 3,743,586 | 7/1973 | Vossen | 156/17 |

*Primary Examiner*—Douglas J. Drummond
*Assistant Examiner*—Jerome W. Massie
*Attorney, Agent, or Firm*—Weingarten, Maxham & Schurgin

[57] ABSTRACT

Thin, dimensionally stable, patterned wafers for precise position sensing as in optical encoders are fabricated by selective photoetching and plating techniques which define wafer configuration and pattern position from a unitary master. The thin wafers employed for the encoder patterns increase encoder shock resistance and lower the inertial mass which must be accelerated during encoder operation. Particular fabrication techniques cooperate with wafer thinness to permit more precise pattern control and positioning.

13 Claims, 8 Drawing Figures

METHOD OF MANUFACTURING A THIN ENCODER DISC

FIELD OF THE INVENTION

This invention relates in general to structures which carry patterns for use in position encoders and more particularly to shock resistant low inertial mass structures for encoder patterns and methods for their fabrication.

BACKGROUND OF THE INVENTION

In encoders for measuring rotation or linear motion, patterns or scales which permit absolute or incremental motion sensing are typically applied to discs or bars. These, in turn, are physically moved with respect to reference marks to permit electro-optical sensing of motion or position. Conventional discs or bars which have sufficient dimensional stability to provide position information to high accuracy are generally formed of relatively thick, heavy and stable material such as glass. Such discs or bars have a large inertial mass and necessarily require mounting and driving mechanisms which can overcome the resulting inertia, particularly where high accelerations are encountered. Conventional discs or bars are typically brittle and may easily break if dropped or if the encoder is jarred.

For high encoder accuracy, the disc or bar must move about an axis or along a line which is precisely located with respect to the scale or pattern thereon. In conventional manufacture, the rotation axis of discs or the axis of linear motion of bars may be defined by the edge of a central aperture in the disc or a border of a bar, or by mounting holes formed through the disc or bar. Where the patterns or scales and positioning edges are formed by separate processes, a potential for misalignment and loss of accuracy exists which will add cost if compensation steps are employed.

BRIEF SUMMARY OF THE INVENTION

In accordance with the preferred embodiment of the present invention, an encoder wafer in the form of a disc or bar is fabricated from a thin, typically glass, blank by a process which provides a product of relatively low inertial mass and high dimensional stability and has an alignment between the encoder pattern and mounting references that is determined by a single master pattern.

In particular implementation, the edges and mounting references of the disc or bar and the scales or patterns thereon are positionally defined by a unitary master which is used to expose both pattern and mounting reference areas in a photoresist layer on one or both sides of the glass blank in a single step. The exposed areas are developed to produce corresponding apertures through the photoresist to the glass blank. A metal layer is plated by evaporation onto the glass in at least the apertures which define the scales or patterns. A protective wax coating is then applied to shield the metal plating in the scale or pattern location from a glass etchant which is subsequently applied to the wafer. The glass blank exposed through the apertures corresponding to the edges and mounting references is attacked by the etchant to cut through the wafer and provide the desired disc or bar. The protective wax and photoresist may be then removed to provide the completed wafer ready for mounting in an encoder.

DESCRIPTION OF THE DRAWINGS

These and other features of the invention will be more fully described below in the detailed description of the preferred embodiment presented for purposes of illustration, and not by way of limitation, and in the accompanying drawings of which.

DESCRIPTION OF THE PREFERRED EMBODIMENT

Figures 1, 2, 3, 4, 5, 6, 7, 8:
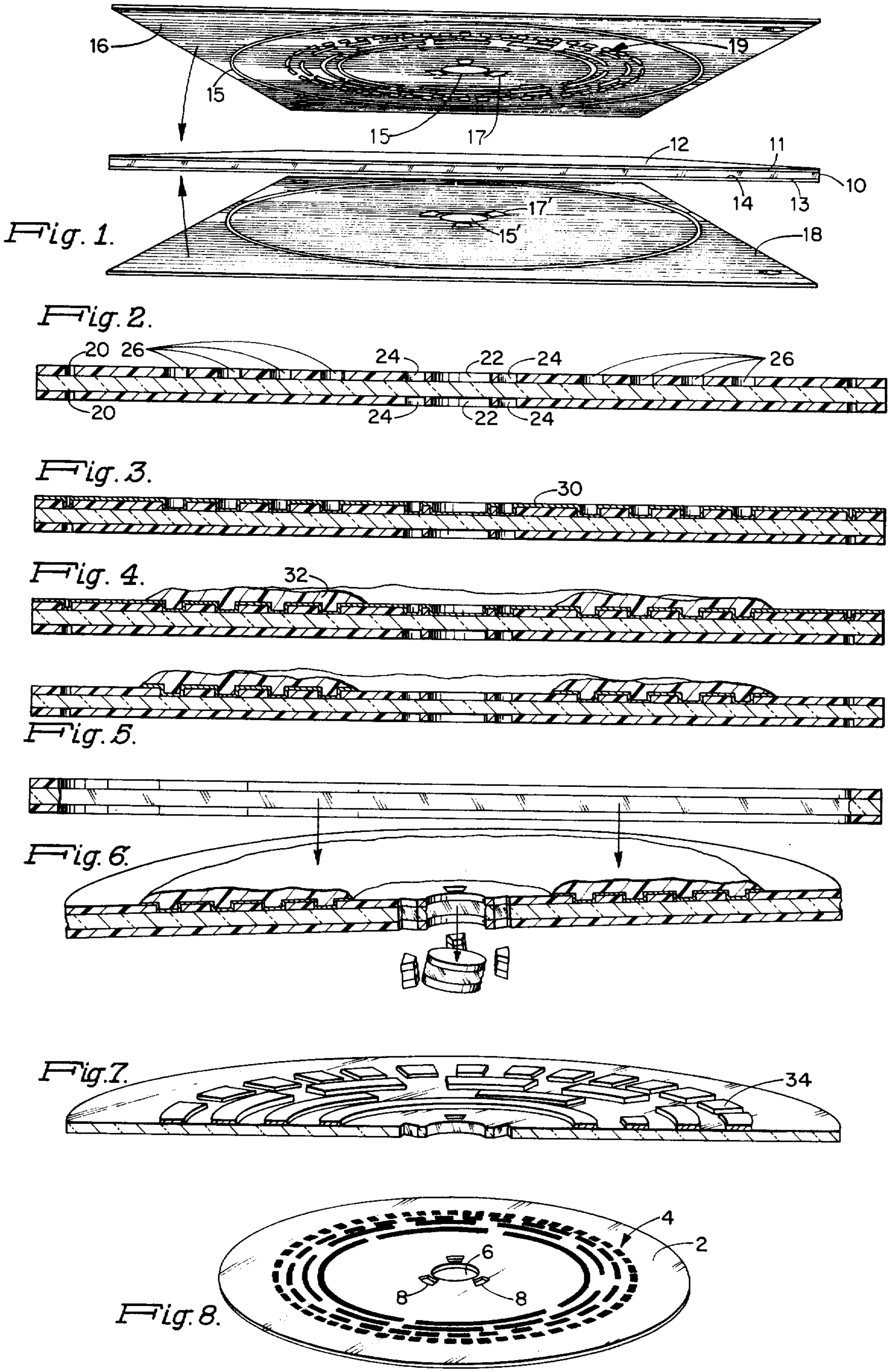
FIG. 1 illustrates in pictorial view an initial step in the process of the invention wherein a thin blank and a set of master patterns are employed to define encoder patterns and mounting holes in the blank.
FIG. 2 is a sectional view illustrating the thin blank after apertures for the encoder pattern and mounting holes are produced in photoresist layers in registration with the master pattern.
FIG. 3 is a sectional view of the blank after a thin metal layer is deposited over exposed encoder pattern areas on one surface of the FIG. 2 structure.
FIG 4 is a sectional view of the thin blank after a layer of protective material is deposited over the metal layer which defines the desired encoder pattern.
FIG. 5 is a sectional view of the thin blank after an optional step of removing the metal layer in regions other than the encoder pattern.
FIG. 6 is a sectional view of the thin blank after photoetching through the photoresist apertures corresponding to the edges and mounting holes.
FIG. 7 is a sectional view of the thin blank after the photoresist and the protective material are removed from the wafer illustrated in FIG. 6.
FIG. 8 is a pictorial view of a completed thin encoder wafer produced from the original blank.

In accordance with the present invention, a shock resistant, low inertia encoder wafer in the form of a disc and methods for its manufacture are presented. The encoder disc produced permits an improvement in encoder reliability and manufacturing efficiency. While the invention may be employed to provide encoder discs or bars in any desired configuration for either linear or rotary motion, the method and structure of the invention will be hereinafter described with particular reference to circular encoder discs as used in optical encoders for measuring rotary motion. This exemplary description should not be seen as a limitation, however, for other forms, especially for linear encoders, are contemplated as well.

The structure resulting from the practice of the present invention is a thin, typically glass, disc as illustrated in FIG. 8 and includes a circular glass plate 2 having an approximate thickness of 0.006 inch. The thickness is shown enlarged out of scale in FIG. 8 for purposes of illustration. The disc 2 will have a series of bands 4 which comprise the encoder scales and are patterned in any desired form to provide preferably digital determination of the position of the disc 2 with respect to an optical reading head. For that purpose, as in the standard encoder, the disc 2 may be attached to a shaft through a central hole 6 which is precisely coaxial with the bands 4 in order to provide precise encoder measurements. Additional holes 8 may be provided for securing the disc to a further plate as by applying cement through the holes 8 to lap over the top edges.

As can be seen from FIG. 8, the disc 2 can be not only precisely positioned by reference to holes 6 or 8 to provide accurate, non-eccentric rotational motion of the bands 4, but in addition the thinness of the disc 2 provides a substantially reduced or negligible inertia against rotation and will greatly improve the response of an encoder employing such a disc. Preferably being made of glass, the disc 2 retains the dimensional stability normally associated with much thicker glass encoder discs, but due to the lightness of weight and relative thinness of the disc 2 displays greater shock resistance either to dropping of the disc 2 itself or to a mechanical blow to the encoder assembly. In either case, the thinness of the disc 2 contributes a flexibility against shock which permits it to withstand greater accelerations and vibrations without breaking.

The production of a thin encoder disc according to the invention, and as illustrated in FIG. 8, is best described in conjunction with FIGS. 1–7 which depict several exemplary stages of the process of fabricating each of a plurality of identical thin encoder discs with a precise alignment between the bands of measurement scales 4 and positioning edges, which may include the inner hole 6 as well as the mounting holes 8.

In the practice of the invention, one will typically have at least one master disc 16 shown in FIG. 1 which has been prepared by any of several known methods. The disc 16 is preferably fabricated of a dimensionally stable, light transmissive plate having an opaque coating except in areas 15, 17 and 19 which respectively define the edges, mounting holes and encoder scales of the disc to be produced. A second master disc 18 having light transmissive areas 15' and 17' defining only the edges and mounting holes respectively of the encoder disc is also preferably provided.

The master discs 16 and 18 will be employed as photographic masks for a typically glass blank 10, approximately 0.006 inch in thickness, covered with photoresist layers 12 and 14 on the respective opposite surfaces 11 and 13. In the case where the photoresist layers 12 and 14 are negative photoresist, the master discs 16 and 18 will be opaque except in areas where corresponding removal of the photoresist in layers 12 and 14 is desired. In particular, master disc 16 which carries, in precise positional relationship, the edge and mounting hole defining areas 15 and 17 as well as the measurement scale band areas 19, will have those areas light transmissive. Similarly, the master disc 18 used for exposing the other photoresist layer will have a light transmissive band or hole 15' for defining the edges, as well as transmissive portions 17' for defining the mounting holes of the disc.

The master discs 16 and 18 are positioned over photoresist layers 12 and 14 respectively in precise registration using known jig techniques. Photoresist layers 12 and 14 are then exposed to light through respective master discs 16 and 18 from light sources not shown. The character of the photoresist material is selected so that exposure of photoresist on one surface of glass blank 10 does not cause spurious exposure of the photoresist disposed on the opposite surface.

Exposed photoresist layers 12 and 14 are next developed by conventional techniques to provide a photoresist pattern as seen in FIG. 2. Apertures 20 in the photoresist define the outer edges of the disc while apertures 22 and 24 define the central hole and mounting holes, respectively. Apertures 26 define the annular bands of the desired encoder scales on the disc. The simultaneous definition of the encoder scales, disc configuration, and disc mounting and positioning holes from a unitary master provides simple but accurate positioning of the scales onto the disc and eliminates any need for separate and cumbersome steps for alignment of the scales and disc positioning edges during manufacture.

In the preferred embodiment of the invention, the use of a second master disc to provide identical edge and mounting holes on the opposite surface of the thin glass blank 10 permits chemical cutting out of the disc from both sides of the blank. Thus, in an alternative embodiment of the invention, photoresist may be applied to only one side of the thin glass blank and exposed through a master such as master 16 containing light transmissive bands corresponding to both the disc positioning edges and the encoder scales. An etchant may then be applied to only one side of the wafer for chemical cutting of the disc therefrom, though both sides may be protected.

Subsequently to forming the apertures in the photoresist, a layer of metal 30, typically Inconel, is evaporated to a thickness typically sufficient for use in optical encoders over the pattern formed in photoresist layer 12 and onto surface 11 of glass blank 10 exposed therethrough. Alternatively, only those portions of the exposed glass surface 11 which correspond to encoder scales in the disc are plated with evaporated metal. Other suitable means of depositing the metal layer 30 on the exposed surfaces of glass blank 10 may be employed.

Referring now to FIG. 4, a layer of protective wax 32 such as asphaltum or any other suitable material which is resistant to glass acid etchants is formed over the plated portions of surface 11 corresponding to the desired encoder scales positioned within a range of radii between the mounting apertures and the edges of the discs. Thus, the protective wax may be efficiently applied to the glass blank such as by employing a mask wherein the area between the determined radii is exposed.

The thin glass blank in FIG. 4 is optionally next placed in a chemical bath, for example hydrocloric acid, to remove the exposed plated metal not covered by protective wax. Subsequently, the thin glass blank 10 of FIG. 4 or FIG. 5 is placed in an acid, glass etching bath. In the case where the exposed metal layer 30 has not been removed as in FIG. 5, the etchant should be suitable for attacking both the unprotected plated metal and the exposed glass but not, in either case, the photoresist or protective wax to a substantial degree. The etchant attacks the glass from respective opposite surfaces, thus efficiently cutting entirely through the thin glass blank 10 to provide the encoder disc of the desired configuration and having the desired mounting holes therein. The disc of FIG. 6 is then placed in suitable solvent baths to remove the remaining protective wax and photoresist. The finished disc shown in FIG. 7 and FIG. 8 has a plated metal pattern on at least one surface thereof in precise desired registration with the edges and with the mounting aperture thereof. The finished disc of FIG. 7 and FIG. 8 may be employed in an encoder by conventional mounting techniques. Typically, the disc is cemented through mounting apertures 8 onto a mounting member and to an encoder shaft inside the encoder.

A longitudinal bar having a scale or pattern formed thereon in predetermined alignment with one or more edges thereof may be similarly formed by the method of the invention, by employing other suitable masters. A plurality of patterned wafers of either disc or bar, or other form, may be simultaneously fabricated from a single blank of thin glass by employing masters which have patterns for a plurality of wafers and by proceeding according to the method described hereinabove.

The use of thin glass material in the practice of the invention enables discs and bars to be formed by photoetching techniques, simultaneously with the formation of desired patterns thereon. The practice of the invention thus provides both an extremely low inertia pattern structure for dynamic motion sensing, as well as extremely accurate alignment between the pattern and the mounting structure.

In an alternative embodiment, other thin sheet material such as dielectrics or conductors may be employed instead of glass to provide patterned wafers for various applications. Also, either positive or negative photoresist technologies may be used in the process. It will be apparent that the illustrations incorporated in the drawings are not necessarily drawn to the scale ultimately desired for the invention but may include distortions which more clearly illustrate the particular features of the invention.

It will occur to those skilled in the art that other modifications and alterations to the disclosure can be achieved without departing from the spirit of the invention. Accordingly, it is intended to limit the scope of the invention only as indicated in the following claims.

What is claimed is:

1. A method for fabricating an encoder pattern on a section of thin sheet material in precise positional alignment with the edges of said section of thin sheet material, said method including the steps of:
- coating a layer of resist on opposite surfaces of a thin sheet of material;
- forming a pattern of apertures in said resist layers on the surfaces of said thin sheet material such that a first portion of apertures in the resist layer on each opposite surfaces of the sheet material are in alignment and a second portion of apertures are formed in the resist layer on only one surface of the thin sheet material;
- coating a material layer sufficient for use in encoder scales onto the entire surface of the resist layer including the first and second portions of apertures on said one surface of the thin sheet material;
- coating a layer of etch-resistant material onto the layer of encoder scale material in those areas of said one surface where the layer of encoder scale material overlies said second portion of apertures;
- selectively etching the exposed portions of the layer of encoder scale material;
- selectively etching through said thin sheet material in the region exposed by the first portion of apertures to separate said section;
- removing the etch-resistant material from said section; and
- removing the remaining portions of said resist from said section.

2. The method of claim 1 wherein said step of forming a pattern includes the steps of selecting a photoresist as the resist material:
- exposing the layers of resist on the surfaces of said thin sheet material to a pattern of light corresponding to the apertures; and
- developing the exposed layers of resist to produce said apertures.

3. The method of claim 1 wherein the encoder scale material includes a metal.

4. The method of claim 3 wherein the metal of the encoder scale material includes Inconel.

5. The method of claim 1 wherein the thin sheet material is approximately 0.006 inch thick glass.

6. The method of claim 1 wherein the etch-resistant material is asphaltum.

7. The method of claim 1 wherein the first portion of apertures include apertures defining mounting holes for said section of thin sheet material.

8. A method for fabricating an encoder pattern on a section of thin sheet material in precise positional alignment with the edges of said section of thin sheet material, said method including the steps of:
- coating a layer of resist on a first surface of a thin sheet of material;
- forming a pattern of apertures in said resist layer on said surface of said thin sheet material such that a first portion of apertures in the resist layer are co-extensive with the desired edges of said section of thin sheet material and a second portion of apertures are co-extensive with a desired encoder scale on said section of thin sheet material;
- coating a material layer sufficient for use in encoder scales onto the entire surface of the resist layer including the first and second portions of apertures on said first surface of said thin sheet material;
- coating a layer of etch-resistant material onto the layer of encoder scale material in those areas where the layer of encoder scale material overlies said second portion of apertures;
- selectively etching the exposed portions of the layer of encoder scale material;
- selectively etching through said thin sheet material in the region exposed by the first portion of apertures to separate said section;
- removing the etch-resistant material from said section; and
- removing the remaining portions of resist from said section.

9. The method of claim 8 wherein the encoder scale material includes a metal.

10. The method of claim 9 wherein the metal of the encoder scale material includes Inconel.

11. The method of claim 8 wherein the thin sheet material is approximately 0.006 inch thick glass.

12. The method of claim 8 wherein the etch-resistant material is asphaltum.

13. The method of claim 8 wherein the first portion of apertures include apertures defining mounting holes for said section of thin sheet material.

* * * * *